Oct. 16, 1956    E. M. ARENTZEN    2,766,871
TAKE-UP FOR ARTICULATED CONVEYOR WITH SWING SECTION
Filed May 22, 1953    2 Sheets-Sheet 2

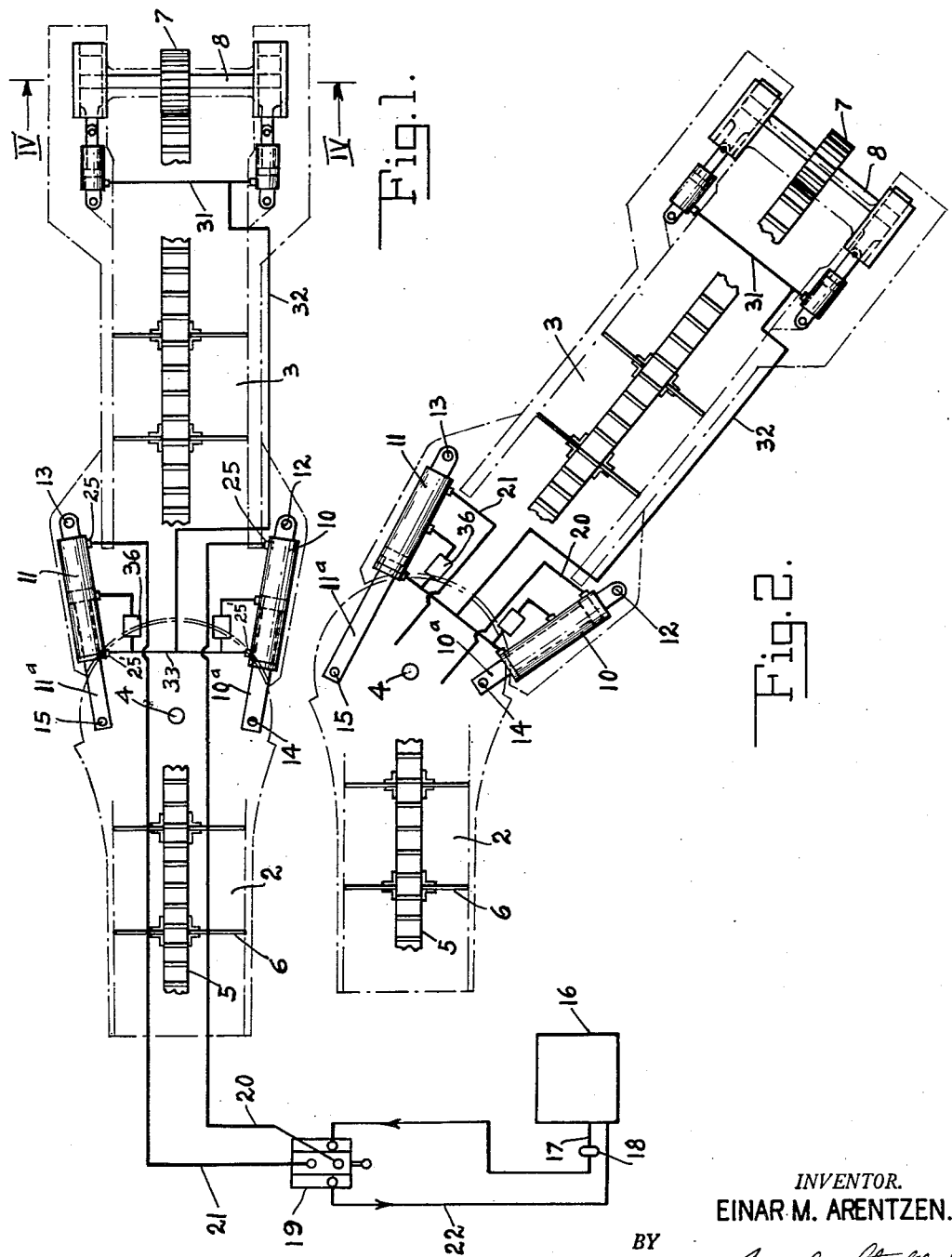

INVENTOR.
EINAR M. ARENTZEN.
BY
ATTORNEYS.

United States Patent Office 2,766,871
Patented Oct. 16, 1956

2,766,871

TAKE-UP FOR ARTICULATED CONVEYOR WITH SWING SECTION

Einar M. Arentzen, Mount Lebanon, Pa., assignor to Lee-Norse Company, Charleroi, Pa., a corporation of Pennsylvania Application May 22, 1953, Serial No. 356,778

2 Claims. (Cl. 198—109)

This invention relates to articulated conveyors and is for a fluid pressure slack take-up for such conveyors.

Articulated conveyors, such as those shown in my Patent No. 1,785,402, granted December 16, 1930, are widely used, especially in mining machines. Such conveyors comprise a single endless chain having flights at intervals thereon, this chain and flights cooperating with a conveyor chute or trough along which the flights on the top reach of the chain slide. In an articulated conveyor, as in mining machines, the discharge section of the trough is supported to swing horizontally so that though the position of the mining machine may be changed, the material may be discharged into a car. These conveyors per se, constitute no part of the present invention.

When the conveyor so constructed is operated from a straight-line fore-and-aft direction to one in which the articulated section is angularly positioned, slack develops in the conveyor chain, and slack take-up devices of an intricate character have heretofore been provided to compensate for this. These slack take-up devices involve the use of a transverse shaft at the discharge end of the conveyor which carries a sprocket or sheave about which the conveyor chain passes, and the transverse shaft is supported in movable bearings so that the shaft can be moved relatively to the conveyor trough and thus take up for slack.

I have heretofore developed an articulated conveyor in which fluid pressure cylinders or rams are used to swing the conveyor. According to the present invention, fluid pressure means, coupled into this system of rams is utilized to maintain proper tension on the chain.

A primary object of my invention therefore is to provide an articulated conveyor with a simple hydraulic or fluid pressure slack take-up, and to incorporate the same into the system for moving the conveyor so that the slack is taken up automatically as the angle of the conveyor is changed.

A further object of the invention is to provide a simplified take-up mechanism for this purpose.

With these and other objects in view, the invention consists in the improved take-up for an articulated conveyor as hereinafter illustrated and described and particularly defined in the appended claims.

The various features of the invention are illustrated in the accompanying drawings, in which:

Fig. 1 is a diagrammatic plan view of a hydraulically-operated mechanism for swinging the movable section of an articulated conveyor and a take-up mechanism for maintaining the proper tension on the conveyor chain for different angular positions of the main and movable sections of the conveyor, the overall contour of the conveyor being shown in dot-and-dash lines, the parts in this figure being in fore-and-aft alignment.

Fig. 2 is a view similar to Fig. 1 showing the discharge end of the conveyor swung to one side of the fore-and-aft axis of the machine;

Figure 3:
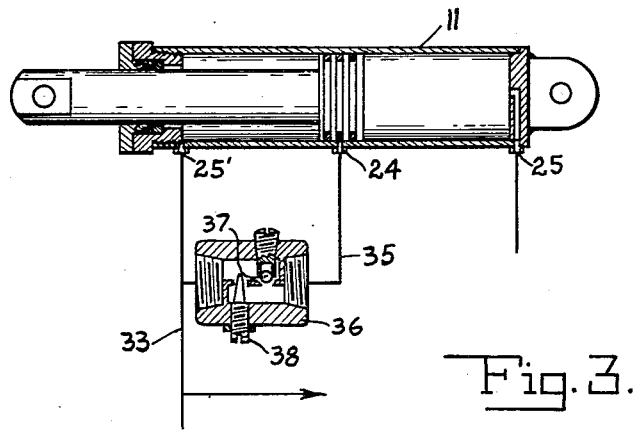
Fig. 3 is a schematic view showing one double-acting cylinder in longitudinal section, and showing the associated tension control valve in section, with the associated pipes being shown as lines.
Figure 4:
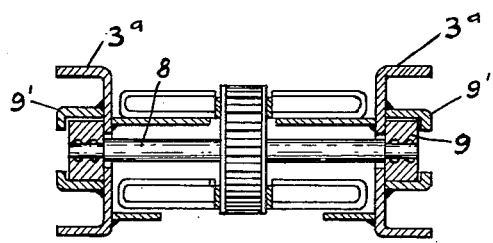
Fig. 4 is a transverse section near the discharge end of the conveyor, being substantially in the plane of line IV—IV of Fig. 1.
Figure 5:
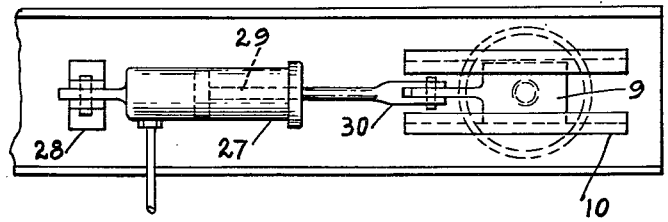
Fig. 5 is a side elevation of the discharge end of the conveyor.

In mining machines of the character to which conveyors of this type are commonly employed, the front or receiving end of the conveyor is close to ground level and is adjacent to a gathering mechanism that moves coal or other material onto the conveyor. The conveyor slopes upwardly and rearwardly from this receiving end, usually having a horizontal reach at the rear of the sloped or inclined portion, while the discharge end of the conveyor, as previously explained, is an articulately movable section. Mining machines of this general type are well known in the art, and one such type of machine is disclosed in my copending application Serial No. 159,851, filed May 3, 1950. In the drawings I have not shown the mining machine or the gathering end of the conveyor, but have shown only that part of the main reach of the conveyor that is adjacent the movable section, and I have not shown the drive for the conveyor.

Referring to the drawings, 2 designates generally the rear end of the main reach of the conveyor, and 3 is the movable discharge section. The section 3 is mounted to swing about a pivot point 4 so that it may swing in a horizontal arc. As is well understood in conveyors of this kind, the side walls of the chute-like conveyor trough are flexible in the region where this swinging motion takes place. These flexible side walls are not illustrated.

The conveyor itself comprises an endless chain 5 having spaced flights 6 thereon, which slide in the trough-like sections of the conveyor bed. At the rear end of the conveyor this chain passes around a sprocket 7 mounted on a transverse shaft 8. When the discharge section of the conveyor swings in an arc from one position to another, as from the position shown in Fig. 1 to the position shown in Fig. 2, the chain 5 moves to one side or the other of the pivot point 4, thus developing slack in the conveyor. In order to take up this slack, the transverse shaft 8 is carried in movable bearing blocks 9 mounted in slideways 9' at each side of the channels 3a constituting the sides of the conveyor trough frame. By moving the shaft 8 in a fore-and-aft direction as the conveyor swings, the tension on the chain can be kept uniform. It is with reference to the movement of the shaft 8 that the present invention is primarily concerned.

For swinging the discharge section of the conveyor about the pivot point 4 I provide two double-acting hydraulic rams or cylinder and piston assemblies designated 10 and 11. These two rams are of similar construction, each having a cylinder with a piston operable therein, the piston for the cylinder 10 being designated 10a, and the piston for the cylinder 11 being designated 11a. The cylinder 10 is pivotally anchored at 12 to one side of the movable conveyor frame, and the cylinder 11 is similarly anchored at 13 to an opposite side of the movable conveyor frame. The piston 10a is pivotally anchored at 14 to one side of the main conveyor section, and piston 11a is similarly anchored at 15 to the main conveyor section at the other side. The two double-acting cylinder and piston assemblies are symmetrically arranged, and when discharge section is in a straight line fore-and-aft position with respect to the conveyor, the pistons, as shown in Fig. 1, are midway between the ends of their respective cylinders.

By oppositely actuating the rams, one ram may be lengthened and the other shortened to thereby effect a swinging movement of the conveyor. This is illustrated in Fig. 2 where the ram 11 with its piston 11a have been extended, while ram 10 with its piston has been simultaneously retracted to swing the end of the conveyor to the position shown in Fig. 2.

For operating the hydraulic rams, I preferably use oil, and the fluid pressure system comprises a reservoir 16 having an outlet pipe 17 leading to a pressure pump 18 which in turn is connected to a conventional three-way valve 19. Leading from the three-way valve are two pipes 20 and 21. These two pipes connect to the end cylinders 10 and 11 through ports or connections 25. Leading from the three-way valve 19 there is also a pipe 22 through which fluid is returned to the reservoir 16.

In operation, when the three-way valve is in a neutral position, fluid is passed from the pump 18 to the discharge line 22, and the conveyor stays in a straight fore-and-aft position. However, if the valve 19 is operated in one direction, fluid pressure from the pump is then communicated to the pipe 21, while the pipe 20 is connected to the pipe 22 leading to the reservoir, whereupon fluid under pressure enters the right-hand end of cylinder 11 as viewed in Fig. 1 and Fig. 3, and the ram is operated in the manner shown in Fig. 2 to push the piston 11a toward the left, thus creating a force which tends to rotate the discharge end of the conveyor in a clockwise direction to the position shown in Fig. 2. During this operation fluid which is in the end of the cylinder 10 is forced through the pipe 20 back into the reservoir. If the three-way valve 19 be operated in the reverse direction, of course the piston 10a is extended and the piston 11a is retracted, and the discharge end of the conveyor swings in the other direction.

According to the present invention, and as best shown in Fig. 3, each of the cylinders 10 and 11 has a fluid outlet port 24 therethrough at a point intermediate its ends at the mid point in the travel of the pistons. When the movable conveyor section is in a straight fore-and-aft position, these ports are closed by the pistons in the respective cylinders. Also each cylinder has a port 25' at the end opposite the end to which the pipe 20 or 21, as the case may be, connects.

According to the present invention, a small hydraulic ram or cylinder and piston assembly is mounted at each side of the discharge end of the conveyor. These two assemblies are of identical construction, and they comprise a cylinder 27 which is anchored to the side of the conveyor frame at 28, and a piston 29 that has its free end 30 connected to the bearing block 9 for the shaft 8. A fluid pressure line 31 connects both of these cylinders to each other so that the pressure in them is equalized, and a fluid pressure line 32 is connected into the line 31, and this line 32 is also connected to a cross-connecting pipe 33 that is connected between the two ports 25' of the cylinders 10 and 11.

Leading from the port 24 in each cylinder 10 and 11 is a pipe 35 that is connected to a tension control valve unit 36. This unit has its opposite side connected to the pipe 33, and there are two of these control valves 36, one for each of the two main rams 10 and 11. Each valve 36 has a ball check valve 37 therein which opens to permit the free flow of fluid from the pipe 35 through the valve 36 to the pipe 33. Each valve 36 also preferably has an adjustable flow restricting valve or bleed valve 38 in the form of an adjustable needle which allows only restricted flow of fluid through the valve body 36 in the reverse direction.

When the movable conveyor section is centered, the piston elements of respective pistons in the main cylinders 10 and 11 close the ports 24, and the fluid which is in the lines 33, 32, 31, and in the cylinders 27 is trapped and no movement of the shaft 8 can take place. The ports 24 are closed only when the discharge conveyor extends straight back. When the piston in the cylinder 11 in Fig. 3 moves to the left to swing the conveyor to the position shown in Fig. 2, fluid which is displaced in the left-hand end of the cylinder can flow through pipe 33 into the left-hand end of the cylinder 10, thus transferring fluid from the rear side of one piston to the rear side of the other piston to permit the necessary displacement of the pistons to take place. When the piston of Fig. 3 moves to the left to a point where it uncovers the port 24, some slack will then begin to develop in the conveyor. Pressure from the pump will at this time flow from the right-hand end of the cylinder 11 through the pipe 35 and the check valve into the line 33, and create a pressure in the two cylinders 27, tending to thrust the pistons 29 thereof forwardly and take up the slack. As the swinging movement of the conveyor toward the position shown in Fig. 2 continues, the slack continues to be taken up in this way, the pistons 29 sliding the bearing blocks 9 outwardly toward the discharge end of the conveyor. At the time that the port 24 in the cylinder 11 is in communication with the right-hand end of the cylinder, the corresponding port in the cylinder 10 will be positioned behind the head of the piston in the cylinder 10, i. e., to the right of the piston, and the pump pressure which has been communicated through the valve 36 to the line 33 will act on the opposite side of the piston 10a to retract this piston, so that the two cylinders operate simultaneously to swing the conveyor and the condition of balance that momentarily occurs when both sides of the piston 11a are subject to equal pressure is overcome. When the conveyor is turned to the desired angle, the three-way valve is operated to the neutral position and the parts are hydraulically locked until it is desired to again make some change. Assuming that the discharge end of the conveyor is to be brought back to its straight position, the three-way valve 19 is operated so as to connect the pump pressure with the line 20. At this time the port 24 in the cylinder 11 is opened to the right-hand end of the cylinder, and the cylinder 11 is at this time connected to the pipe 22 leading to the reservoir. As the discharge end of the conveyor swings back to its straight line position, a tension is placed on the sprocket 18, tending to push the pistons 29 back into the cylinders 27. The fluid which is displaced in this way flows back through the pipe 31, pipe 32, pipe 33, and bleeds out through the restricted flow provided by the needle valve 38 into the cylinder, and at the same time fluid which is being displaced behind the piston in the cylinder 10 can flow in behind the piston in the cylinder 11. Of course when the discharge section of the conveyor reaches the straight fore-and-aft position, ports 24 in both cylinders are again closed. The purpose of the ball check valve in the control units 36 therefore is to permit the pump pressure to be imposed upon the cylinders 27 when the conveyor is moving to either side of the center position, while the purpose of the restricted flow valves 38 in the control unit 36 is to allow displacement of fluid back to the reservoir when the pistons 29 move back to relieve the tension on the chain as the conveyor moves to its straight line position. In place of adjustable valves 38, fixed orifices of proper size may be put in lines 20 and 21 and prevent too violent swinging of the conveyor section.

My invention thus provides a fluid pressure mechanism for maintaining the proper tension on the conveyor chain, and taking up for slack that develops. The hydraulic mechanism herein provided is positive in its operation, simple and cheap to install, and operates automatically under the control of the valve which operates the rams 10 and 11. Adjustment takes place automatically without any thought on the part of the operator, and at any position of the conveyor the closing of the operating valve 19 hydraulically locks all of the ports in the position to which they have been moved.

In the drawings, I have shown the shaft 8 as being an idler shaft, but it may be a drive shaft for the conveyor as will be well understood by those familiar with this type of mechanism. In that case, bevel gearing is provided at the end of the shaft 8 connected to driving motors through telescoping shaft which allow for the take-up movement of the shaft.

In the drawings I have shown a preferred form of my invention. Since the structure of the conveyor itself is not of importance, I have not shown the structural details.

I claim:

1. In an articulated trough and chain conveyor system having a main section and a movable discharge section and having two double-acting main operating rams for swinging the articulated section in a horizontal arc, each ram having a cylinder and piston, a fluid pressure system including a reservoir, a pump, a three-way control valve and a separate line leading from the three-way control valve to one end of each of the two main cylinders whereby flow of fluid to or from either cylinder may be blocked or pressure selectively applied to one cylinder while the other is in communication with the reservoir, a conveyor chain tensioning cylinder and piston, means connecting said last-named cylinder with said fluid pressure system in such manner as to apply pressure to said cylinder when the main cylinders are operated to move the articulated conveyor section in a direction tending to develop slack in the chain and to release pressure therefrom when the main cylinders are operated to move the conveyor section in a direction to take up slack, said means including a cross connection between the ends of the two main cylinders opposite those to which the pipes from the control valve lead, a separate connection leading from said cross connection to a port which is provided in the mid portion of each main cylinder and which port is closed by the piston in the main cylinder only when the movable section is in a straight line position with respect to the main section, each such separate connection having valve means to permit free flow of fluid from the port to the cross connection and restricted flow in the reverse direction, and a fluid pressure line connecting said cross connection between the two main cylinders and the cylinder of the conveyor tensioning cylinder and piston.

2. The combination with an articulated conveyor having a main section and a section movable in a horizontal arc relative to the main section with an endless chain running the length of the two sections, a sprocket at the free end of the movable section around which the chain passes, said sprocket being carried on a shaft, a movable bearing block at each end of the shaft, fluid pressure cylinders anchored at each side of the movable conveyor section, each having a piston connected to the adjacent bearing block for the shaft for effecting longitudinal movement of the sprocket, a pair of double-acting fluid operated rams for swinging the movable section arcuately with respect to the main one, a fluid pressure system and control valve for selectively controlling the operation of the rams, said cylinders for moving the sprocket having a fluid pressure connection with each other, and a single fluid pressure line leading from said connection into the fluid pressure system for said rams whereby fluid pressure directly from the said fluid pressure system actuates said cylinders when the rams are operated.

References Cited in the file of this patent
UNITED STATES PATENTS

| | | |
|---|---|---|
| 2,527,542 | Rose | Oct. 24, 1950 |
| 2,642,981 | Lindgren | June 23, 1953 |
| 2,665,794 | Slomer | Jan. 12, 1954 |